Oct. 6, 1925.

R. E. PIERCE

TELEGRAPH MEASURING SYSTEM

Filed Nov. 20, 1924

1,555,875

INVENTOR
R. E. Pierce
BY
ATTORNEY

Patented Oct. 6, 1925.

1,555,875

UNITED STATES PATENT OFFICE.

RALPH E. PIERCE, OF LARCHMONT, NEW YORK, ASSIGNOR TO AMERICAN TELEPHONE AND TELEGRAPH COMPANY, A CORPORATION OF NEW YORK.

TELEGRAPH MEASURING SYSTEM.

Application filed November 20, 1924. Serial No. 751,144.

*To all whom it may concern:*

Be it known that I, RALPH E. PIERCE, residing at Larchmont, in the county of Westchester and State of New York, have invented certain Improvements in Telegraph Measuring Systems, of which the following is a specification.

This invention relates to electrical measuring systems and particularly to means for determining the magnitude of an interfering current in the receiving relay of a telegraph system, which current may be set up therein by sources either within or extraneous to such system.

In a telegraph system it is frequently desirable to determine the magnitude of the current flowing through the receiving relay of the system, and particularly an interfering current. One of the causes of such a flow of current is unbalance between a line circuit and an artificial line, which unbalance establishes a difference of potential across the terminals of the receiving relay when signals are transmitted from the same terminal circuit with which the relay is connected. Another form of interfering current, known as cross-fire current, may also flow through the receiving relay from the line circuit being set up therein by other adjacent circuits. Since currents from these and other sources interfere with the proper reception of the signaling currents which are transmitted over the line and intended for reception by the relay in which the interfering currents tend to flow, it is desirable to determine the magnitude of such interfering currents in order that proper steps might be taken to diminish their effects upon the relay.

One of the objects of this invention is to provide a method and means for measuring these interfering currents.

Figure 1:
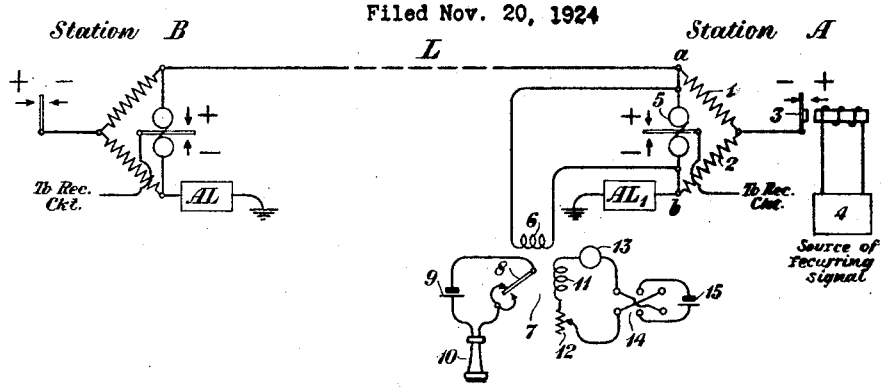
Figure 2:
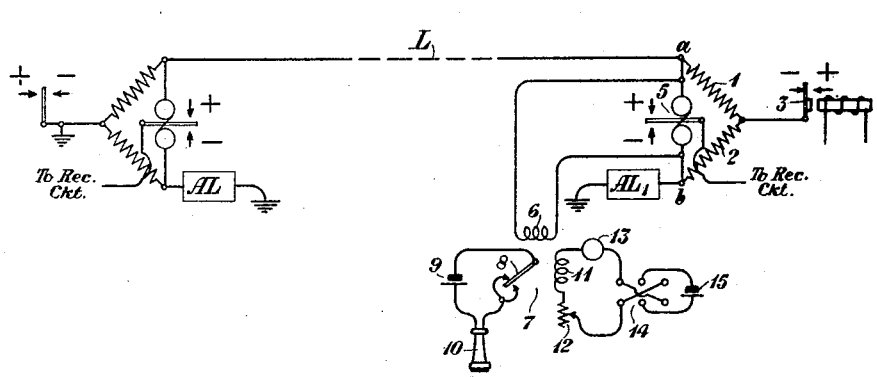
Figure 3:
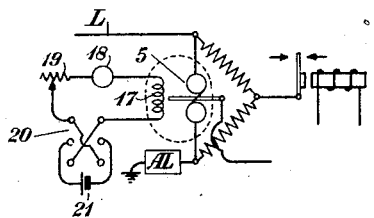

Other objects of this invention will be apparent from the following description when read in connection with the attached drawing of which Figure 1 shows schematically a form of embodiment of the invention for measuring the interfering current set up in a relay by unbalance between a line circuit and an artificial line, which interfering current arises from the transmission of signals from the same terminal circuit with which the relay is connected; Fig. 2 shows schematically the arrangement for measuring crossfire currents produced in a line circuit by other adjacent circuits; and Fig. 3 shows a modification of the measuring circuits of Figs. 1 and 2.

In Fig. 1 the line circuit L is terminated at the stations A and B by the bridge duplex circuits, each having an artificial line to balance the real line. Thus at station A the line L is connected with the ratio arm 1 at the point $a$ and the artificial line $AL_1$ with the ratio arm 2 at the point $b$. Connected with the apex of the ratio arms is a pole changer 3 having connected therewith a source 4 of a recurring signal. Bridged across the ratio arms between the points $a$ and $b$ is a receiving relay 5. Connected in parallel with the windings of the receiving relay is a winding 6 of a differential relay 7 which constitutes part of the measuring circuit. The armature 8 of this relay is connected through the battery 9 with one terminal of the receiver 10, the other terminal of which is connected with both contacts of the said armature. Another winding 11 of relay 7 is connected in series with a variable resistance 12 and an ammeter 13, the said connection including the contacts of a reversing switch 14 to the mid-points of which is connected a battery 15. The object of this reversing switch is to control the direction of the flow of current through winding 11, the purpose of which will be later described. The terminal circuit at station B is preferably of the normal bridged polar duplex type and needs no detailed description.

The method of determining the magnitude of the current flowing through relay 5 due to lack of balance between the line L and the artificial line $AL_1$ is as follows: With the transmission of signals by the pole changer at the distant station B, the flow of current through winding 6 will cause the armature 8 to open and close the circuit including the receiver 10, the movement of the armature depending upon the transmitted signal. The switch 14 is then closed in such position that current from the source 15 will flow through the winding 11 in such direction as to oppose the effect upon the armature 8 of the operating current in winding 6. The resistance 12 is then varied until the effects of these opposing currents are substantially equal, which condition will be evidenced by the absence of noise in the receiver 10. The magnitude of the neutralizing current may be determined either by the ammeter 13 or by the resistance 12, assuming that the latter has been calibrated. Now signals are sent from the pole changer 3 into the line L while signals are being received at station A from the distant station B. If there is not an exact balance between line L and artificial line $AL_1$ interfering currents will flow through the receiving relay 5 and the winding 6 of the measuring relay 7 in addition to the operating currents from the distant station B. The result of these interfering currents in relay 6 is an occasional movement of the armature 8 which will be manifested by a sound in the telephone receiver 10. Then, if the resistance 12 is varied to again cause the relay 7 to be unoperated, the change in the resistance 12 to effect this result is a measure of the interfering current caused by unbalance.

The arrangement shown in Fig. 2, which is intended to measure the interfering current set up in a receiving relay by a source extraneous to the system itself, is structurally substantially that shown in Fig. 1. In Fig. 2 the line circuits $L_1$ and $L_2$, which are the source of this interfering current, would be terminated by some form of transmitting and receiving circuits which might be similar to those shown in connection with the line L. When signals are transmitted, for example, over the line $L_1$, cross-fire currents will be produced in the line L and such currents will flow to ground at each end of the said line through the receiving relays connected with the terminal circuits at each end. This cross-fire current will not only flow through the receiving relay 5 but also through the winding 6 of relay 7. Assuming that signals are not being transmitted from station B to station A over the line L, the magnitude of the cross-fire current may be determined in substantially the same manner in which the unbalance current was determined, as described hereinbefore in connection with Fig. 1. That is to say, the unbalance current, flowing through the relay 5 and through the winding 6 of relay 7, will be evidenced by the action of the receiver 10. The effect of this current upon relay 7 would then be opposed by current through winding 11, the magnitude of which may be readily determined in the manner described. If, however, signals are being transmitted over the line L at the same time which it is desired to measure the interfering current, the relay 7 must be biased by an amount corresponding to the strength of the signal current. The additional biasing necessary to overcome the cross-fire current is a measure of the latter current.

The arrangement shown in Fig. 3, while differing structurally from the arrangement shown in Figs. 1 and 2, operates upon substantially the same principle. The relay 5 has connected therewith a winding 17, which is in addition to the operating windings. The purpose of winding 17 is to oppose the effect upon the armature of this relay of currents through the operating windings. The winding 17 is connected in series with a meter 18 and a variable resistance 19, the connection including a reversing switch 20 having a source of potential 21 connected therewith. The arrangement shown in Fig. 3 renders unnecessary the extra winding 6, because the function of that winding is performed by the operating winding of relay 5. A receiver and a source of potential should be connected with the contacts and the armature of relay 5 in the manner in which such apparatus is connected with relay 7 of Fig. 1, but for the purpose of simplicity these details have been omitted from Fig. 3.

While this invention has been disclosed as embodied in particular forms and for the performance of particular functions, it is not so limited since it is capable of embodiment in other forms and likewise capable of performing other functions without departing from the spirit and scope of the appended claims.

What is claimed is:

1. In a system for measuring the margin of operation of a telegraph system, the combination with a line circuit of a terminal circuit having an artificial line, bridge arms, a transmitter connected with the midpoint thereof, and a receiving relay connected across the extremities thereof, and means connected with the receiving relay to indicate the range of interfering current throughout which the receiving relay will continue to receive signals.

2. In a system for measuring the margin of operation of a telegraph system, the combination with a line circuit of a terminal circuit having an artificial line, bridge arms, a transmitter connected with the midpoint thereof and a receiving relay connected across the extremities thereof, and a differential relay having one winding connected in parallel with the said receiving relay and having another winding connected with a variable source of current, and indicating means connected with the armature of the said differential relay.

3. The method for measuring the margin of operation of the receiving relay of the circuit defined by claim 2 which consists in applying a recurring signal to the midpoint of the said arms, varying the balance of the said line and artificial line and determining the magnitude of the unbalance current.

4. In an electrical testing system, the combination with a line circuit having a voltage set up therein of an electromagnetic device connected with the said line circuit, and means connected with the said electromagnetic device to oppose the effect therein of current received from the said line circuit, the said latter means having means to indicate the magnitude of the opposing current.

5. In an electrical testing system, the combination with a line circuit of an artificial line, means to apply a potential to the said line circuit and the said artificial line and a relay having one winding connected between the said line and the said artificial line, and having a second winding connected with a second source of potential and means to vary the magnitude and the direction of the current from the said second source through the said second winding to oppose the effect of the current through the said first winding.

In testimony whereof, I have signed my name to this specification this 18th day of November 1924.

RALPH E. PIERCE.